US006841586B2

United States Patent
Free et al.

(10) Patent No.: US 6,841,586 B2
(45) Date of Patent: *Jan. 11, 2005

(54) FELTED HYDROPHILIC ESTER POLYURETHANE FOAMS

(75) Inventors: Sharon A. Free, Wallingford, PA (US); Charles V. Rose, Newtown Square, PA (US)

(73) Assignee: Foamex, L.P., Linwood, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/744,052

(22) Filed: Dec. 23, 2003

(65) Prior Publication Data

US 2004/0162361 A1 Aug. 19, 2004

Related U.S. Application Data

(63) Continuation-in-part of application No. 10/074,606, filed on Feb. 12, 2002, now Pat. No. 6,756,416.
(60) Provisional application No. 60/435,277, filed on Dec. 23, 2002.

(51) Int. Cl.$^7$ .............................................. C08G 18/28
(52) U.S. Cl. ..................... 521/172; 521/110; 521/112; 521/130; 525/123; 525/127; 525/453
(58) Field of Search ................. 521/110, 112, 521/130, 172; 525/123, 127, 453

(56) References Cited

U.S. PATENT DOCUMENTS

| 3,125,542 | A | | 3/1964 | Haines |
| 3,405,217 | A | | 10/1968 | Garrett et al. |
| 3,423,338 | A | | 1/1969 | Sutton |
| 3,425,890 | A | | 2/1969 | Powers |
| 3,857,133 | A | | 12/1974 | Linenfelser |
| 4,656,196 | A | * | 4/1987 | Kelly et al. ................... 521/52 |
| 4,670,477 | A | | 6/1987 | Kelly et al. |
| 4,777,186 | A | * | 10/1988 | Stang et al. .................. 521/50 |
| 4,985,467 | A | * | 1/1991 | Kelly et al. ................... 521/52 |
| 5,640,737 | A | | 6/1997 | Boggs |
| 5,698,601 | A | | 12/1997 | Welte |
| 6,103,822 | A | | 8/2000 | Housel |
| 6,391,933 | B1 | * | 5/2002 | Mattesky ..................... 521/114 |

FOREIGN PATENT DOCUMENTS

| GB | 858 127 | 1/1961 |
| GB | 789 481 | 1/1988 |

* cited by examiner

*Primary Examiner*—John M. Cooney, Jr.
(74) *Attorney, Agent, or Firm*—Connolly Bove Lodge & Hutz LLP

(57) ABSTRACT

An ester polyurethane foam is prepared by reacting a mixture of one or more polyester polyols with one or more isocyanates and one or more silicone surfactants in the presence of a blowing agent, such as water, and other additives, such as catalysts. The cured foam is chemically treated in a caustic solution and is then felted (compressed under heat and pressure) to form a hydrophilic ester polyurethane foam having a water absorption rate of at least 30 pounds of water per square foot per minute (1.44 kPa/min). The foam also has greater water holding capacity and wet strength than cellulose.

14 Claims, No Drawings

FELTED HYDROPHILIC ESTER POLYURETHANE FOAMS

CROSS-REFERENCE TO RELATED APPLICATIONS

This application is a continuation in part of U.S. patent application Ser. No. 10/074,606, filed Feb. 12, 2002 now U.S. Pat. No. 6,756,416. This application further claims priority from U.S. Provisional Application Ser. No. 60/435,277, filed Dec. 23, 2002.

This invention relates to certain ester polyurethane foams that have been chemically modified and then felted (compressed under heat and pressure), following which the foams have unexpectedly improved liquid absorption and wicking. The foams may be incorporated into articles used to wipe and absorb liquids, such as household cleaning sponges and mop heads.

BACKGROUND OF THE INVENTION

Polyurethane foams are generally prepared by the reaction of an active hydrogen-containing compound (i.e., a polyol) and a polyisocyanate, in the presence of a blowing agent such as water, and usually a reaction catalyst and foam stabilizer. The cellular polymer structure of polyurethane foam has a skeletal framework of relatively heavy strands forming an outline for the cell structure. The skeletal framework strands are connected by very thin membranes, often called windows, which form the cell walls. In open-celled foams, some of the windows are open or torn in each cell, thus forming an interconnecting network open to fluid flow (liquid or gas). However, conventional polyurethane foams are not sufficiently porous or open-celled to allow significant fluid flow therethrough.

Reticulation relates to methods for removing or breaking the cell windows of polyurethane foams. Mechanical, chemical and thermal methods for reticulating foams are known. As one example, foam may be reticulated by melting the windows with a high temperature flame front or explosion, which still leaves the strand network intact. Alternatively, the cell windows may be etched away using the hydrolyzing action of water in the presence of an alkali metal hydroxide. See U.S. Pat. Nos. 3,125,542; 3,405,217; 3,423,338; 3,425,890 and 4,670,477 for descriptions of various reticulating methods for polyurethane foams.

Household cleaning sponges and mop heads most commonly are formed from cellulose. Paper pulp is the primary ingredient for cellulose sponges. The pulp is reacted with carbon disulfide to form a soluble cellulose xanthate compound. This compound is dissolved into a honey-like liquid viscose and mixed with reinforcing fibers to add strength to the pulp mixture. The cellulose is formed with a double cell structure to replicate natural sea sponges. Sodium sulfate crystals are added to the pulp, and this mixture is heated in a mold to melt the crystals. Heating regenerates the mix to pure cellulose and leaves the signature sponge holes where the crystals have melted away. Bleaching chemicals and humectants maintain the moisture level and color purity of the cellulose sponge. While the cellulose has good water absorption and wicking, it has lower wet integrity than other materials. Moreover, upon drying, the cellulose becomes hard and brittle such that it must be pre-wet before using for wiping.

Open celled ester and ether polyurethane foams have greater softness and flexibility than cellulose, and retain flexibility upon drying without humectants. As compared to cellulose, foams have greater wet strength, better wet integrity and exhibit less swelling when wet. Foams also can be foamed to have a double cell structure to more resemble natural sea sponges. Generally, polyurethane foams can be produced more cheaply than cellulose. However, polyurethane foams are hydrophobic, lacking good liquid absorption and wicking characteristics, which makes them less suitable for household sponges and mop heads. Even after the polyurethane foams are post-treated with surfactants in an attempt to improve water absorption and wicking, they still do not match the performance of cellulose for these properties.

Reticulated polyurethane foams have been used as components of filters. Such foams also have been suggested for use as components of household sponges, particularly for the abrasive surface presented by a reticulated foam. See U.S. Pat. Nos. 3,857,133 and 5,640,737. The art still seeks polyurethane foams suitable to replace cellulose materials as liquid absorbing and wicking components of household sponges and mop heads.

SUMMARY OF THE INVENTION

According to the invention, a hydrophilic ester polyurethane foam is made by first forming a cellular polyurethane foam that has a network of at least some strands and at least some cell windows by mixing together certain foam-forming components. Typically, the recipes for polyurethane foams are expressed in terms of parts by weight per 100 parts polyol. Thus, for each 100 parts by weight of a polyester polyol, the foam formulation according to the invention includes: from 20.0 to 62.0 parts by weight of an isocyanate; from 1.5 to 5.0 parts of a blowing agent, such as water; from 0.5 to 2.0 parts of a blow catalyst; from 0 to 0.3 parts of a gel catalyst, and from 1.0 to 3.0 parts of a stabilizing surfactant, such as a silicone surfactant. Other additives such as antimicrobial additives, double cell additives, dyes, pigments, colorants, crosslinking additives, fragrances, detergents and extenders may also be incorporated into the foam formulation.

After the foam forming components have been mixed together, the foam is permitted to rise and cure, preferably under atmospheric temperature and pressure. The resulting foam has pore sizes preferably in the range of from 70 to 130 pores per linear inch (27.6 to 51.2 pores per cm), most preferably 70 to 90 pores per linear inch (27.6 to 35.4 pores per cm), but may also have a double cell or sea sponge-like structure. The preferred double cell structure has a distribution of larger and medium sized cells scattered across a background of finer cells. The larger cells may range from 0.06 to 0.09 inches (1.52 to 2.29 mm) in diameter.

The cured foam is cut into slabs and then chemically treated by immersing the slab in a heated caustic bath for from three to fifteen minutes, preferably from six to ten minutes. One preferred caustic bath is a sodium hydroxide solution (from 5.0 to 10.0 percent, preferably 7.5% NaOH) that is heated to from 70° F. to 160° F. (21 to 71° C.), preferably from 120° F. to 160° F. (49 to 71° C.). The caustic solution etches away at least a portion of the cell windows within the foam cellular structure, leaving behind a hydrophilic ester polyurethane foam. The treated foam is compressed between calendaring rolls, and then rinsed thoroughly and oven dried.

After treating, the foam is felted by compressing the foam to from one-half (½) to one-twentieth (1/20) of its initial thickness, preferably from one-third (⅓) to one-eighth (⅛) of its initial thickness, and heating the compressed foam at a temperature of from 340 to 380° F. (171 to 193° C.) for from 10 to 60 minutes.

After felting, the foam structure comprises a hydrophilic ester polyurethane foam with good wicking characteristics that will absorb water at a rate of at least about 30 pounds of water per square foot per minute (1.44 kPa/min), preferably at least 35 pounds of water per square foot per minute (1.68 kPa/min). The foam also has greater water holding capacity and wet strength than cellulose. The felted hydrophilic ester polyurethane foam does not swell appreciably upon absorbing and retaining liquids and would make an ideal component of a household sponge or mop head.

DESCRIPTION OF THE PREFERRED EMBODIMENTS

Hydrophilic ester foams according to the invention are prepared preferably by mixing together the polyol component with the surfactants, catalysts, blowing agents and other additives, forming a polyol pre-mix. To the polyol pre-mix is added the isocyanate component. The foam mixture is then allowed to rise and cure, preferably under atmospheric conditions, to form the hydrophilic ester polyurethane foam. The foam-forming process may be carried out batch-wise, semi-continuously or continuously.

Polyester polyurethane foams are more hydrophilic than polyether polyurethane foams due to the increased polarity of the carboxylic acid groups. Suitable polyester polyols for producing flexible polyester polyurethane foams are well known in the industry. Illustrative of such suitable polyester polyols are those produced by reacting a dicarboxylic and/or monocarboxylic acid with an excess of a diol and/or polyhydroxy alcohol, for example, adipic acid, glutaric acid, succinic acid, phthalic acid or anhydride, and/or fatty acids (linolic acid, oleic acid and the like) with diethylene glycol, ethylene glycol, propylene glycol, dipropylene glycol, 1,4-butanediol, neopentyl glycol, trimethylolpropane, trimethylolethane, and/or pentaerythritol. Examples of these polyols are LEXOREZ 1102-50 or LEXOREZ 1102-60 from Inolex Chemical Company or FOMREZ 50 or FOMREZ 60 from Crompton Corporation. Other suitable polyester polyols can be prepared by reacting a lactone with an excess of a diol such as caprolactone with propylene glycol. See U.S. Pat. No. 4,331,555 for further discussion of suitable polyester polyols. Preferably, the polyester polyol is made by reacting adipic acid and ethylene glycol monomers with a glycerin initiator. Hydrophilic ester polyols are typically reaction products of polyethylene glycol and adipic acid. Examples are FOMREZ 45 from Crompton and LEXOREZ 1105-HV2 from Inolex Chemical Company. Most preferably, the polyol component of the foam-forming mixture of the invention comprises at least five (5) parts by weight, preferably ten (10) parts by weight, of a 50 hydroxyl hydrophilic ester polyol. 60 hydroxyl ester polyols and mixtures of 50 hydroxyl and 60 hydroxyl ester polyols and 50 hydroxyl hydrophilic ester polyols are also preferred.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl group sites per molecule. Preferably, the polyester polyols used to form the foams of the present invention have a hydroxyl number in the range of 20 to 150, more preferably in the range of 40 to 100, and most preferably in the range of 50 to 60.

The term "polyisocyanate" refers particularly to isocyanates that have previously been suggested for use in preparing polyurethane foams. "Polyisocyanates" include di- and poly-isocyanates and prepolymers of polyols and polyisocyanates having excess isocyanate groups available to react with additional polyol. The amount of polyisocyanate employed is frequently expressed by the term "index", which refers to the actual amount of isocyanate required for reaction with all of the active hydrogen-containing compounds present in the reaction mixture multiplied by 100. For most foam applications, the isocyanate index is in the range of between about 75 to 140. In this invention, the preferred isocyanate index is in the range of 90 to 110, most preferably 100 or below, with a particularly preferred range of 95 to 98.

The polyester polyurethane foams are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). The methylene diisocyanates suitable for use are diphenyl methane diisocyanate and polymethylene polyphenyl isocyanate blends (sometimes referred to as "MDI" or "polymeric MDI"). The MDI blends can contain diphenylmethane 4, 4' diisocyanate, as well as 2, 2' and 2, 4' isomers and higher molecular weight oligomers and have an isocyanate functionality of from about 2.1 to 2.7, preferably from about 2.1 to 2.5. Preferably, the isocyanate is selected from a commercial mixture of 2,4- and 2,6-toluene diisocyanate. A well-known commercial toluene diisocyanate is TD80, a blend of 80% 2, 4 toluene diisocyanate and 20% 2, 6 toluene diisocyanate. Polyisocyanates are typically used at a level of between 20 and 90 parts by weight per 100 parts of polyol, depending upon the polyol OH content and water content of the formulation.

One or more surfactants are also employed in the foam-forming composition. The surfactants lower the bulk surface tension, promote nucleation of bubbles, stabilize the rising cellular structure, emulsify incompatible ingredients, and may have some effect on the hydrophilicity of the resulting foam. The surfactants typically used in polyurethane foam applications are polysiloxane-polyoxyalkylene copolymers, which are generally used at levels between about 0.5 and 3 parts by weight per 100 parts polyol. In the present invention, from 1.0 to 3.0 parts by weight per 100 parts polyol of surfactant is preferred. Surfactants, which may for example be organic or silicone based, such as FOMREZ M66-86A (Witco) and L532 (OSi Specialties) may be used to stabilize the cell structure, to act as emulsifiers and to assist in mixing. Most preferably, the surfactant is a cell opening silicone surfactant in an amount from 1.5 to 2.5 parts by weight per 100 parts polyol.

Catalysts are used to control the relative rates of water-polyisocyanate (gas-forming or blowing) and polyol-polyisocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-polyisocyanate reaction, whereas the organotin catalysts are known to have a greater effect on the polyol-polyisocyanate reaction. Total catalyst levels generally vary from 0 to 5.0 parts by weight per 100 parts polyol. The amount of catalyst used depends upon the formulation employed and the type of catalyst, as known to those skilled in the art. Although various catalysts may be used in the present invention, we have found that the following ranges of catalyst amounts are satisfactory: amine catalyst from 0.5 to 2.0 parts, per 100 parts polyol; and organotin catalyst from 0 to 0.7 parts, preferably from 0 to 0.3 parts, per 100 parts polyol.

Suitable urethane catalysts useful in the present invention are all those well known to the worker skilled in the art, including tertiary amines such as triethylenediamine, N-methylimidazole, 1,2-dimethylimidazole, N-methylmorpholine, N-ethylmorpholine, triethylamine, tributylamine, triethanolamine, dimethylethanolamine and bisdimethylaminodiethylether, and organotins such as stannous octoate, stannous acetate, stannous oleate, stannous laurate, dibutyltin dilaurate, and other such tin salts.

A double-cell structure may be created to replicate the appearance of natural sea sponges. Materials used to create a double cell structure may be added to the foam forming mixture. These include: castor oil derivatives, stearic acid, acetic acid and low melting point waxes. These materials create voids larger than the prevailing pores within the resulting foam structure. If used, the double-cell additive preferably is added in an amount from 0.04 to 0.21 parts per 100 parts polyol.

A blowing agent may be included in the foam-forming composition. The most typical blowing agent is water that may be added in amounts from 1.5 to 5.0 parts per 100 parts polyol. Alternative blowing agents are liquid carbon dioxide, volatile organic compounds, such as pentane and acetone, and chlorinated compounds, such as methylene chloride, HFC's, HCFC's and CFC's.

Optionally, other additives may be incorporated into the foam-forming composition. The optional additives include, but are not limited to, antimicrobial compounds, stabilizers, extenders, dyes, pigments, crosslinking additives, fragrances, detergents and anti-static agents. Such additives should not have a detrimental effect on the properties of the final polyurethane foam. For sponge and mop head applications, preferably an antimicrobial compound is added in an amount from 0.5 to 1.5 parts per 100 parts polyol.

The hydrophilic ester polyurethane foam has cell sizes preferably ranging from 70 to 130 pores per linear inch (27.6 to 51 pores per cm), most preferably 70 to 90 pores per linear inch (27.6 to 35.4 pores per cm), but may also have a double cell or sea sponge-like structure. The preferred double cell structure has a distribution of larger and medium sized cells scattered across a background of finer cells. The larger cells may range from 0.06 to 0.09 inches (1.5 to 2.3 mm) in diameter.

The foam is then chemically reticulated to remove cell windows by immersing the slab in a heated caustic bath for from three to fifteen minutes, preferably from six to ten minutes. One preferred caustic bath is a sodium hydroxide solution (from 5.0 to 10.0 percent, preferably 7.5% NaOH) that is heated to from 70° F. to 160° F. (21 to 71° C.), preferably from 120° F. to 160° F. (49 to 71° C.). The caustic solution etches away at least a portion of the cell windows within the foam cellular structure, leaving behind a hydrophilic ester polyurethane foam. The treated foam is compressed between calendaring rolls, and then rinsed thoroughly and oven dried.

After treating, the foam is felted by compressing the foam to from One-half (½) to one-twentieth (1/20) of its initial thickness, preferably from one-third (⅓) to one-eighth (⅛) of its initial thickness, and heating the compressed foam at a temperature of from 340 to 380° F. (171 to 193° C.) for from 10 to 60 minutes. The compression ratio is generally referred to as a firmness. For example, a foam compressed to one-third of its original thickness is a firmness 3 felt. A foam compressed to one-fifth of its original thickness is a firmness 5 felt.

The invention is further illustrated, but not limited, by the following examples.

EXAMPLES

Cellulose sponges were obtained. The cellulose sponges of Examples C1, C2 and C3 were from 3M, Nylonge and Spontex, respectively. Based on our testing, cellulose had a rate of water absorption of 29 to 35 lbs. water/$ft^2$/minute (1.39 to 1.68 kPa/min) and an effective water absorption of over 40% (44%).

Polyurethane foams were prepared on a laboratory scale by mixing together the foam-forming ingredients and pouring them into a 15"×15" (38.1×38.1 cm) cardboard box to form foam buns under atmospheric pressure (e.g., 1 atm.) and temperature (about 75° F. (24° C.)). The foam ingredients were mixed according to the proportions shown in Table 1. Amounts are in kilograms and are based on parts by weight per hundred parts polyol. The foams of Examples C4 to C6 are comparison foams not prepared according to the invention. The foams of Examples 1 to 7 were prepared with formulations according to the invention, but were not felted. The foams of Examples Portions of the foam bun for each Example were cut into slabs and chemically treated or modified. The slabs were immersed in a heated solution of 7.5% sodium hydroxide in water (heated to at least 120° F. (49° C.)) for eight minutes. The slabs were then compressed between calendar rollers to squeeze out most of the caustic solution. The slabs were then rinsed to remove the remaining caustic solution and then dried in an oven.

Example C4 was prepared as a standard ester polyurethane foam. The foam of Example C5 was prepared with a hydrophilic polyol. Neither of the foams from Examples C4 and C5 was chemically modified. Example C6 is a thermally reticulated hydrophilic ester foam. Although the Example C6 foam had completely open cells, this foam had a very low liquid absorption rate.

TABLE 1

Polyurethane Foam Formulations

|  | C4 | C5 | C6 | 1 | 2 | 3 | 4 | 5 | 6 | 7 |
|---|---|---|---|---|---|---|---|---|---|---|
| 1102-50A | 100.0 | 0 | 0 | 100.0 | 90.0 | 75.0 | 90.0 | 90.0 | 90.0 | 90.0 |
| F45 | 0 | 100.0 | 100.0 | 0 | 10.0 | 25.0 | 10.0 | 10.0 | 10.0 | 10.0 |
| B8301 | 2.0 | 0 | 0 | 2.0 | 2.0 | 2.0 | 2.0 | 2.0 | 2.0 | 0 |
| Y6353 | 0 | 0 | 0 | 0 | 0 | 0 | 0 | 0 | 0 | 2.0 |
| SE232 | 0 | 1.0 | 1.0 | 0 | 0 | 0 | 0 | 0 | 0 | 0 |
| DM50 | 0 | 0 | 0 | 1.5 | 1.5 | 1.5 | 1.5 | 0.75 | 0.75 | 1.5 |
| Water | 3.9 | 4.3 | 4.3 | 3.9 | 3.9 | 3.8 | 3.9 | 2.7 | 1.8 | 3.9 |
| DC additive | 0.2 | 0 | 0 | 0.2 | 0.14 | 0.14 | 0 | 0.17 | 0.26 | 0.9 |
| NEM | 0.35 | 1.7 | 1.7 | 0.35 | 0.35 | 0.35 | 0.35 | 0.35 | 0.3 | 0.35 |
| DM70 | 0.61 | 0 | 0 | 0.61 | 0.61 | 0.61 | 0.61 | 0.61 | 0.52 | 0.61 |
| K5N | 0.3 | 0 | 0 | 0.3 | 0.35 | 0.35 | 0.7 | 0.5 | 0.5 | 0.43 |

TABLE 1-continued

Polyurethane Foam Formulations

|  | C4 | C5 | C6 | 1 | 2 | 3 | 4 | 5 | 6 | 7 |
|---|---|---|---|---|---|---|---|---|---|---|
| TD80 | 45.5 | 34.5 | 34.5 | 45.5 | 45.5 | 44.5 | 45.5 | 34.1 | 25.6 | 45.5 |
| Index | 98 | 70 | 70 | 98 | 98 | 98 | 98 | 98 | 98 | 98 |
| Density (lbs/ft$^3$) | 1.70 | 1.88 | 1.88 | 1.91 | 1.61 | 1.61 | 1.86 | 2.85 | 4.05 | 1.78 |
| Pore size ppi) Background | 70 | 70 | 70 | 70 | 70 | 70 | 100 | 70 | 70 | 70 |
| Cell size (in.) Large holes | 0.035–0.085 | N/A | N/A | 0.063–0.147 | 0.063–0.147 | 0.063–0.147 | N/A | 0.035–0.085 | 0.035–0.085 | 0.035–0.085 |

LEXOREZ 1102-50A is an ester polyol with a hydroxyl number of 50 supplied by Inolex Chemical Company. F45 is FOMREZ 45, a 50 hydroxyl hydrophilic ester polyol offered by Crompton. TEGOSTAB B8301 is a cell opening silicone surfactant from Goldschmidt Chemical Corporation. NIAX Silicone Y6353 is a cell opening silicone surfactant from OSi Specialties. ULTRAFRESH DM50 is an antimicrobial additive supplied by Thomson Research. The double cell additive ("DC additive") is a castor oil derivative used to provide an optional sea sponge like structure to the foam. KOSMOS K5N is a stannous octoate catalyst (tin catalyst) from Goldschmidt Chemical Corporation. NEM is an amine catalyst, n-ethyl morpholine. TD80 is a toluene diisocyanate mixture comprised of 80 percent 2,4-toluene diisocyanate and 20 percent 2,6-toluene diisocyanate. The "index" is the isocyanate index. The cellular structure of the foam can be uniform or have a distribution of different cell sizes. The uniform cell structure is described by the number of pores per linear inch. The number is derived from a visual comparison of the foam to a standard. Double-cell foams have cells of varying sizes. The pores of the larger cells are within the stated range.

Sponges were cut to a desired sample size of 4.75 inches by 3.0 inches by 0.625 inches (12.1 cm by 7.6 cm by 1.6 cm). Before testing, cellulose sponges were washed in a washing machine for two cycles to remove water soluble materials or additives (e.g., humectants). Polyurethane foam samples were not pre-washed.

The rate of liquid absorption (or wicking rate) was determined according to the following test method. The weight and dimensions of a damp sponge sample are measured. The sponge has a generally rectangular front and rear surface and a certain thickness. The length and thickness of the sponge are measured to the nearest 0.01 inches (0.25 mm). The sponge is wrung out and its wrung out weight is recorded. A perforated plate is placed in the bottom of a solid tray. Water is added to a depth of ⅛ inch (3 mm) over the perforated plate. The sponge is placed on the surface of the perforated plate and into the pool of water. One side surface of the sponge is held within the pool such that the front and rear faces of the sponge are held perpendicular to the surface of the water pool. The sponge is removed after 5 seconds, and without losing water from the sponge, the sponge is weighed. The wet weight is recorded to the nearest 0.01 grams. The rate of water absorption is reported as pounds of water per square foot per minute. It is calculated as the wet weight minus the wrung out weight divided by the length times the thickness of the sponge.

The percent effective absorption indicates the percent of water by volume a damp sponge will retain after saturation and draining for five minutes. The absorption is reported in cubic inches of water held by a cubic inch of sponge. The dimensions (length, width and thickness) of a damp sponge are measured to the nearest 0.01 inches (0.25 mm). The wet volume is calculated. Wring out the sponge and record the wrung out weight to the nearest 0.01 grams. The sponge is then fully immersed in a pool of warm water, squeezed to remove trapped air and allowed to absorb water for one minute. The sponge is removed with a hook and hung vertically for five minutes to allow water to drain therefrom. Thereafter, the sponge is reweighed to the nearest 0.01 grams—denominated the wet weight. The percent water retained by volume is calculated. The percent effective absorption is the wet weight minus the wrung out weight divided by the wet volume.

The percent total absorption indicates the total amount of water a sponge can hold after draining for five minutes in a vertical position and is expressed as a percentage of its original dry weight. The sponge is immersed in warm water and squeezed to remove trapped air. The sponge is allowed to absorb water for one minute. The sponge is then removed from the water with a hook and hung vertically to allow water to drain for five minutes. Thereafter, the sponge is weighed and the drained weight is recorded to the nearest 0.01 grams. Excess water is squeezed out of the sponge by hand. The sponge then is dried in an air-circulating oven for at least four hours at 220° F., cooled to room temperature and re-weighed. The dry weight of the sponge is recorded to the nearest 0.01 grams. The percent total absorption is 100 times the amount of water retained after draining (drained weight minus dry weight) divided by the dry weight of the sponge.

Wet out time measures the time duration required for a drop of water to be absorbed completely by a damp sponge sample. The sponge sample is immersed in water and squeezed while in the water to remove trapped air. Upon removing from the water, the sponge is wrung out as completely as possible. A drop of water is placed on a facing surface of the damp sponge. The time for the drop to be absorbed by the damp sponge is recorded. The average wet out time was calculated after the test is repeated five times.

Wipe dry is evaluated by pouring 50 grams of water on a clean level surface. The sample sponge is weighed before the test and after each wiping pass across the water until no more water is absorbed. The sponge is not wrung out before or after weighing. The weight of the water picked up by the sponge after each pass is recorded.

Water holding capacity is measured by weighing a dry sponge, then immersing the sponge sample in water, squeezing to remove trapped air, soaking the sponge for five minutes, and weighing the saturated sponge. The water holding capacity is the weight of water held per gram of sponge.

TABLE 2

Comparative Test Results - Cellulose and Prior Foams

| | Sample | | | | | |
|---|---|---|---|---|---|---|
| | C1<br>3M | C2<br>Nylonge | C3<br>Spontex | C4<br>Standard ester | C5<br>Hydrophilic ester | C6<br>Hydrophilic ester (reticulated) |
| Rate of absorption | 25.1 | 31.7 | 21.4 | 10.8 | 5.2 | 2.7 |
| % Effective absorption | 46% | 43% | 57% | 44% | N/A | N/A |
| % Total absorption | 1418% | 1299% | 1649% | 1947% | N/A | N/A |
| Wet out time | Instantly | Instantly | Instantly | Instantly | Instantly | >1 min. |
| Wipe Test | | | | | | |
| First pass | 48.8 g | 49.4 g | 44.8 g | 25 g | 23 g | N/A |
| Second pass | 47.1 g | 48.2 g | 48.7 g | 36 g | 36 g | N/A |
| Third pass | | | 48.6 g | 43 g | 44 g | N/A |
| Fourth pass | | | | 45 g | 45 g | N/A |
| Water holding capacity (g/g foam) | 14.2 | 13.0 | 16.5 | 31.7 | 33.6 | 33.7 |
| Density (pcf) | 3.52 | 3.91 | 3.77 | 1.70 | 1.88 | 1.88 |

TABLE 3

Comparative Test Results - Inventive Foams

| | Sample | | | | | | |
|---|---|---|---|---|---|---|---|
| | 1<br>unfelted | 2<br>unfelted | 3<br>unfelted | 4<br>unfelted | 5<br>unfelted | 6<br>unfelted | 7<br>unfelted |
| Rate of absorption | 28.4 | 24.2 | 25.7 | 22.0 | 27.9 | 20.1 | 20.0 |
| % Effective absorption | 23.6% | 25.3% | 26.4% | 48.9% | 41.5% | 35.4% | 33.8% |
| % Total absorption | 949% | 1114% | 1217% | 1867% | 1037% | 607% | 1358% |
| Wet out time | Instantly | Instantly | Instantly | Instantly | Instantly | Instantly | Instantly |
| Wipe Test | | | | | | | |
| First pass | 46.3 g | 45.7 g | 45.0 g | 49.3 g | 47.5 g | 47.2 g | 47.4 g |
| Second pass | 48.1 g | 45.9 g | 47.9 g | 48.0 g | 48.7 g | 46.7 g | 46.3 g |
| Third pass | 46.2 g | 46.5 g | 48.5 g | | 48.2 g | | |
| Fourth pass | | 46.1 g | 46.4 g | | | | |
| Water holding capacity (g/g foam) | 25.0 | 27.6 | 28.1 | | | | |

Referring to the data presented in Tables 2 and 3, the unfelted foams (Examples 1–7) had excellent absorption rates and performed comparable to cellulose sponges (Examples C1, C2 and C3). The Example 1 foam was made from a low index conventional polyester formulation and was chemically modified in a caustic solution. The Example 1 foam wicked water and wiped similarly to the cellulose sponges, and had a greater water holding capacity. The foam of Example 1 performed unexpectedly better than foams of equivalent composition that were not chemically modified (Example C4) and a hydrophilic ester foam (Example C5). Thus, the combination of low index and chemical treating, particularly where the foam is formed with a cell opening silicone surfactant, creates an unexpectedly superior hydrophilic ester polyurethane foam. The foams of Examples 2 to 7 performed similarly to Example 1.

Other observations are evident from the data presented. Example 2 shows that adding 10 parts per hundred of a hydrophilic polyol can increase the total absorption of the resulting foam. The finer cell structure of Example 4 increased the effective and total absorption values of the foam and improved the wipe dry. Examples 5 and 6 show the effect of increasing density. Example 7 shows the effect of a different surfactant type on water absorbing properties.

Further improvements to water absorption properties were achieved once the foams were felted. In Tables 4 and 5, Examples 8 to 13 are according to the invention, and Comparative Examples C5 to C9 represent prior art cellulose or ester polyurethane foams. Comparative Examples C5, C7 and C8 were not felted. Examples 8, 9 and 10 incorporated the same ester polyurethane formulation with at least 5 parts by weight of a hydrophilic polyester polyol made from an adipic acid and a polyethylene glycol, but the foams of Examples 9 and 10 were felted.

TABLE 4

| | Sample | | | | | | | |
|---|---|---|---|---|---|---|---|---|
| | 8 Fine cell ester polyurethane | 9 Fine cell ester polyurethane | 10 Fine cell ester polyurethane | 11 Double cell ester polyurethane | 12 Double cell ester polyurethane | 13 Double cell ester polyurethane | C7 Cellulose | C8 Cellulose |
| Firmness | Unfelted | 3 | 5 | Unfelted | 4 | 8 | Unfelted | Unfelted |
| Density (pcf) | 2.0 | 6.2 | 10.5 | 1.8 | 7.3 | 13.9 | 3.8 | 6.6 |
| Rate of absorption (lbs/ft$^2$/min) | 21.8 | 48.3 | 77.9 | 41.9 | 70.2 | 36.3 | 29.4 | 46.1 |
| % Effective absorption | 28 | 53 | 53 | — | — | — | 44 | — |

TABLE 5

| | Sample | | | |
|---|---|---|---|---|
| | C5 Hydrophilic ester "ACQUELL" | C9 Hydrophilic ester "ACQUELL" | 8 Fine cell ester polyurethane | 9 Fine cell ester polyurethane |
| Firmness | Unfelted | 3 | Unfelted | 3 |
| Rate of absorption (lbs/ft$^2$/min) | 5.2 | 8.0 | 21.8 | 48.3 |

ACQUELL is a registered trademark of Foamex L.P.

Felting the foams according to the invention achieved surprisingly higher rates of water absorption and effective water absorption. The rates of water absorption for the felted foams of Examples 9 and 10 of the invention at various felting firmnesses exceeded the water absorption for other polyurethane foams and for cellulose. Compare Examples 9 and 10 with Example 8 and with Comparative Examples C5 to C9.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

We claim:

1. A method far making a hydrophilic ester polyurethane foam, comprising:
   (a) forming a polyurethane foam by mixing together the following components:
      (i) 100 parts by weight of an ester polyol mixture, wherein at least 5.0 parts by weight of the ester polyol mixture comprises a hydrophilic polyester polyol made from an adipic acid and a polyethylene glycol;
      (ii) from 20.0 to 62.0 parts by weight, based on 100 parts polyol, of an isocyanate, wherein the isocyanate index is 120 or less; and
      (iii) from 1.0 to 3.0 parts by weight, based on 100 parts polyol, of a silicone stabilizing surfactant;
   (b) treating the polyurethane foam in a caustic bath to form the hydrophilic ester polyurethane foam, and
   (c) felting the treated foam,
   wherein the hydrophilic ester polyurethane foam has a water absorption rate of at least 20 pounds of water per square foot per minute.

2. The method of claim 1, further comprising from 1.0 to 5.0 parts by weight, based on 100 parts polyol, of a blowing agent as a component.

3. The method of claim 1, wherein the blowing agent is water.

4. The method of claim 1, further comprising as a component a catalyst selected from the group consisting of: gel catalysts and gas forming catalysts, and mixtures thereof.

5. The method of claim 1, further comprising from 0.5 to 2.0 parts of a blow catalyst and from 0 to 0.3 parts of a gel catalyst.

6. The method of claim 1, further comprising a double cell-forming additive as a component.

7. The method of claim 1, further comprising an antimicrobial additive as a component.

8. The method of claim 1, wherein the caustic bath is formed as a solution containing sodium hydroxide.

9. The method of claim 1, wherein the treated foam is felted by compressing the foam to from one-third to one-eighth of its original thickness.

10. The method of claim 1, wherein the treated foam is felted by compressing the foam while heating the treated foam to a temperature of from 340 to 380° F. (171 to 193° C.).

11. The method of claim 1, wherein before felting, the hydrophilic ester polyurethane foam has pore sizes in the range of 70 to 130 pores per linear inch (27.6 to 51 pores per cm).

12. The method of claim 1, wherein the isocyanate index is 100 or less.

13. The method of claim 1, wherein the hydrophilic ester polyurethane foam has an instantaneous wet out.

14. A hydrophilic ester polyurethane foam made according to the method of claim 1.

* * * * *

UNITED STATES PATENT AND TRADEMARK OFFICE
CERTIFICATE OF CORRECTION

PATENT NO. : 6,841,586 B2
DATED : January 11, 2004
INVENTOR(S) : Sharon A. Free et al.

It is certified that error appears in the above-identified patent and that said Letters Patent is hereby corrected as shown below:

Column 11,
Line 49, "far" should read -- for --.

Signed and Sealed this

Nineteenth Day of April, 2005

JON W. DUDAS
*Director of the United States Patent and Trademark Office*